United States Patent [19]
Tsukino et al.

[11] Patent Number: 5,177,680
[45] Date of Patent: Jan. 5, 1993

[54] ELECTRONIC MAIL SYSTEM WITH MEANS TO TRANSMIT DATA TO A PLURALITY OF RECIPIENTS WITHOUT USER INTERVENTION

[75] Inventors: Hiroshi Tsukino, Kawasaki; Seizi Ohgomori, Funabashi; Ryoichi Nakazato, Ebina, all of Japan

[73] Assignees: Hitachi, Ltd.; Hitachi Computer Consultant, Ltd., both of Tokyo, Japan

[21] Appl. No.: 259,313

[22] Filed: Oct. 18, 1988

[30] Foreign Application Priority Data

Oct. 21, 1987 [JP] Japan .................. 62-263825

[51] Int. Cl.⁵ .......................................... G06K 15/02
[52] U.S. Cl. .................................................. 364/401
[58] Field of Search ............... 364/401; 340/825.44, 340/825.55; 379/96, 93, 94, 5, 8, 89

[56] References Cited

U.S. PATENT DOCUMENTS

| | | | |
|---|---|---|---|
| 4,321,703 | 3/1982 | Schwaertzel et al. | 358/425 |
| 4,380,009 | 8/1983 | Long et al. | 340/825.44 |
| 4,381,562 | 4/1983 | Acampora | 455/12 |
| 4,659,876 | 4/1987 | Sullivan et al. | 379/96 |
| 4,713,780 | 12/1987 | Schultz et al. | 379/96 |
| 4,755,932 | 7/1988 | Diedrich | 379/96 |
| 4,803,487 | 2/1989 | Willard et al. | 340/825.44 |
| 4,837,798 | 6/1989 | Cohen et al. | 379/94 |
| 4,922,518 | 5/1990 | Gordon et al. | 379/93 |

OTHER PUBLICATIONS

"Storage Type Data Transfer System", English Abstract, 57-131148, 34 E142.

Primary Examiner—Gail O. Hayes
Attorney, Agent, or Firm—Antonelli, Terry, Stout & Kraus

[57] ABSTRACT

An electronic mail system includes a plurality of terminals, a business processing system connected to the plural terminals for effecting a business processing so as to output a result of the processing as output data, a transmitter mail box connected to the business processing system for storing a list containing information for each output data to specify terminals as receiving points which receive the output data, and a receiver mail box connected to the business processing system for storing the output data for each receiving point specified by the list. The output data in the receiver mail box is selectively outputted to the terminal in response to a request from the terminal as the receiving point.

14 Claims, 5 Drawing Sheets

FIG. 2

| MAIL NAME | WEEKLY SALES REPORT |
|---|---|
| RECEIVER NAME | TERMINAL Te 1 |
| TRANSMITTER NAME | TERMINAL T1 |
| JOB NAME OF TRANSMISSION DATA | JOB 1 |
| PAGE RANGE | 1 ~ 10 |
| DELIVERY DATE / TIME | OCT. 1, 1:00 P.M. |

FIG. 3

| MAIL NAME | WEEKLY SALES REPORT |
|---|---|
| TRANSMITTER NAME | TERMINAL Te 1 |
| RECEPTION DATE / TIME | OCT. 1, 1:00 P.M. |
| RECEPTION DATA ADDRESS | ..... |

ELECTRONIC MAIL SYSTEM WITH MEANS TO TRANSMIT DATA TO A PLURALITY OF RECIPIENTS WITHOUT USER INTERVENTION

BACKGROUND OF THE INVENTION

The present invention relates to an electronic mail system for electronically delivering information to a communicating partner, and in particular, to an electronic mail system for delivering output data produced from a business processing system.

In firms and companies, business processing systems are employed to carry out business jobs, for example, for effecting daily, weekly, or monthly jobs such that a daily, weekly, or monthly report is periodically outputted from the computer system. The report thus outputted is temporarily stored as output data in an auxiliary storage so as to be printed out by use of a high-speed printer. The printed matter is then delivered from an electronic data processing (EDP) section to divisions and sections requiring the printed matter.

In such a division, based on the data of the delivered report, various jobs are conducted to produce data for the decision making, to analyze the data, or to generate other reports. For these purposes, it is necessary to input again the data in a data processing equipment such as a personal computer dedicatedly used in the division.

However, the conventional method above is attended with the following problems.

That is, there is required human work when the output data generated from the business processing system is to be delivered to the divisions and sections requiring the data and when the delivered data is to be inputted again for the processing and analysis thereof. In addition, when a great amount of output data is delivered in a form of printed matter, a large space is required for the storage and accumulation thereof; furthermore, a long period of time is necessary to retrieve data thus stored.

As described above, according to this method, a considerable period of time is required to re-input the data and there exists a chance of a mis-input, which leads to problems that the reliability of the result of the data processing and analysis is lowered and the decision making results in an error or is delayed.

On the other hand, there has been described in the JP-A-57-131148 a system in which data created by a terminal in a time-sharing system (TSS) by use of a host computer is transferred to another terminal specified so as to deliver the data without producing the printed matter thereof.

In this system, however, the terminal to which the data is transferred is required to be specified when the data is created. Consequently, in a case where output data periodically produced is to be transferred to terminals, the terminal as the transfer destination is required to be specified through an operator for each data transfer, which deteriorates the efficiency of data delivery.

SUMMARY OF THE INVENTION

It is therefore an object of the present invention, for removal of the disadvantages above of the conventional apparatus, to provide an electronic mail system capable of automatically effecting a transmission processing of data outputted from a computer to a terminal without necessitating intervention of the operator.

In order to achieve the objects above, according to one aspect of the present invention, a transmission list including information of a transmission destination terminal for each output data is stored in a memory employed as a transmitter mail box such that when output data is outputted from a computer, the information of the list stored in the memory is referenced so as to automatically conduct a transmission processing of the output data to the corresponding terminal.

In the configuration above, since the transfer processing of the output data can be automatically accomplished without necessitating an operator's intervention, the efficiency of the transmission processing is improved and hence the processing capacity of the computer is increased. Particularly, the effect is emphasized when the output data is periodically outputted.

In addition, according to another aspect of the present invention, the output data is stored in a memory employed as a receiver mail box for each terminal as the destination of the transmission specified by use of the transmission list such that the output data thus stored in the memory is selectively outputted to the transmission destination terminal in response to a transmission request therefrom.

In consequence, since the output data is automatically stored in the memory for each terminal as the transmission destination, the data transmission processing is automatically achieved without necessitating the operator's intervention, thereby increasing the processing capacity of the computer. Furthermore, when the operator requiring the output data can freely and correctly receive the data directly from the memory at a high speed.

BRIEF DESCRIPTION OF THE DRAWINGS

The present invention will be apparent from the following detailed description taken in conjunction with the accompanying drawings in which:

FIG. 2 is a schematic diagram showing an example of a transmission list in a transmitter mail box;

FIG. 3 is a schematic diagram showing an example of a reception list in a transmitter mail box;

DESCRIPTION OF THE PREFERRED EMBODIMENTS

Referring now to the accompanying drawings, description will be given in detail of embodiments according to the present invention.

Figure 1:
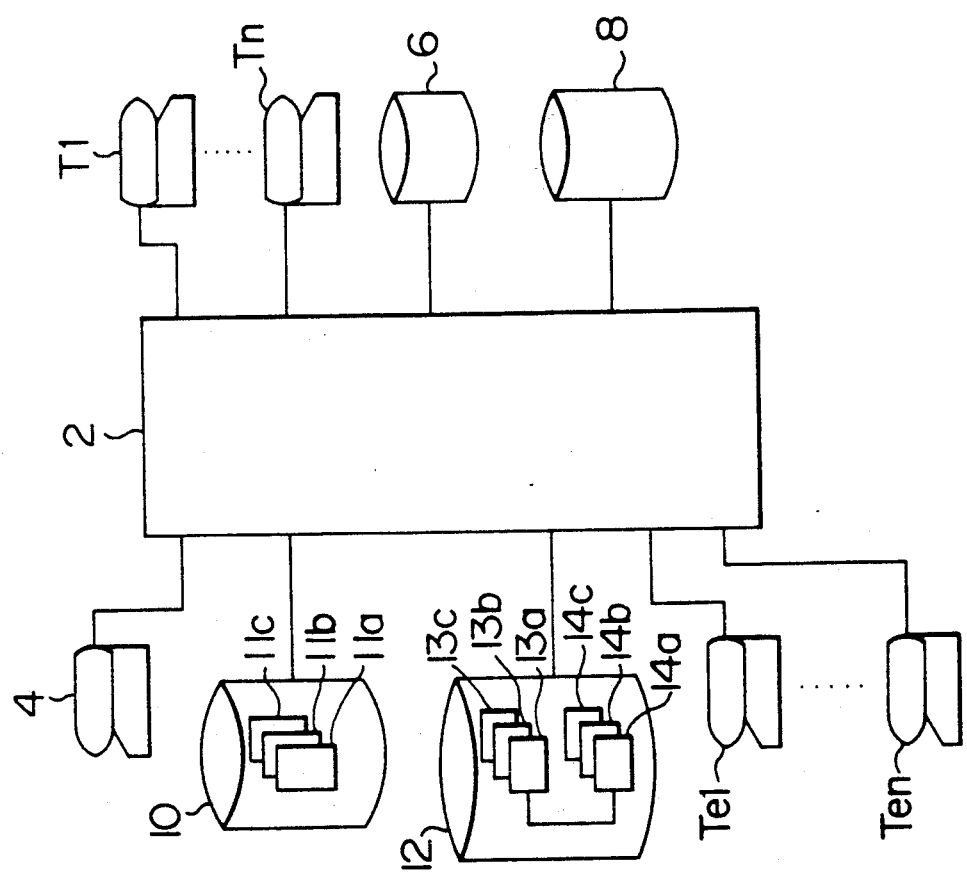
FIG. 1 is a configuration diagram of an embodiment of an electronic mail system according to the present invention.

FIG. 1 is a configuration diagram of an embodiment of an electronic mail system according to the present invention. The configuration of FIG. 1 includes a business processing system 2, for example, a host computer, and business terminals T1 to Tn to effect operations such as an operation to input business data and an operation to instruct a processing content to be effected by the system 2 and a transfer destination of the processing result.

Data inputted through the terminals T1 to Tn is processed in the processing system 2 so as to be temporarily stored in a file 6 such that the data is selectively transferred therefrom to the terminals T1 to Tn or to receiver terminals Te1 to Ten.

Next, description will be given of a configuration employed to effect a transfer processing of output data periodically supplied from the system 2. Reference numeral 4 indicates a terminal, for example, a manager's terminal to input information necessary to achieve a transmit processing of the output data periodically produced from the system 2, and the information is stored as transmission lists 11a, 11b, etc. via the system 2 into a transmitter mail box 10.

The output data periodically supplied from the system 2 is temporarily stored in a file 8 so as to be thereafter loaded in a receiver mail box 12 together with information of a transmission list corresponding to the output data in the mail box 10.

The data thus stored in the mail box 12 is selectively supplied to one of the receiver terminals Te1 to Ten in response to a request therefrom.

Incidentally, in the configuration of FIG. 1, for simplification of the description, the terminals Te1 to Ten receiving the data periodically outputted from the system are different from the business terminals T1 to Tn; however, the business terminals may also be used as the receiver terminals.

Similarly, the manager's terminal may also be used as a business terminal and/or a receiver terminal.

The data periodically outputted from the system includes data to be daily, weekly, monthly, or yearly totaled or processed, and description will be given here of an example of a weekly sales report created by totaling the sales amount data for each week.

FIGS. 2 and 3 show examples respectively of a transmission list and a reception list stored as tables in the transmitter mail box and the receiver mail box, respectively. The transmission list is created through the manager's terminal, whereas the reception list is produced through a process of the transmission processing.

FIG. 2 shows the transmission list 11a in which the mail name is a weekly sales report, the receiver name is, for example, the terminal Te1, the transmitter name is, for example, the business terminal T1, the job name of the transmission data, namely, the name of the output data is, for example, job 1, the page range is denoted as 1 to 10, and the delivery day/time on which the output data is desired to be delivered to the receiver mail box is indicated as Oct. 1, 1:00 P.M. In a case where the data identical to those of the weekly sales report of the list 11a are to be sent to a receiver terminal other than the terminal Te1, there may be disposed another transmission list for the pertinent receiver terminal or the name thereof may be specified as the receiver name in the list 11a. In this fashion, for each output data, a list to be used for the transmission processing is created in the mail box 10 by use of the terminal 4.

FIG. 3 is an example of a reception list to be created as follows. That is, when the output data is stored in data file 14a, 14b, etc. in the mail box 12, information of the transmission list corresponding to the output data is read from the mail box 10 so as to be stored in the corresponding reception list 13a, 13b, etc., thereby preparing the reception list. The reception list 13a of FIG. 3 corresponds to the transmission list 11a, where the mail name is a weekly sales report, the transmitter name is the business terminal T1, the reception day/time, namely, the date when the output data is stored is indicated as Oct. 1, 1:00 P.M., and the reception data address is an address of the data file 14a at which the corresponding output data is stored.

The receiver mail box is disposed, for example, for each reception terminal, namely, in a receiver mail box, there are disposed the different reception lists for the respective mail names. Incidentally, for simplification, the configuration of FIG. 1 includes the receiver mail box 12 only for the terminal Te1.

Figure 4:
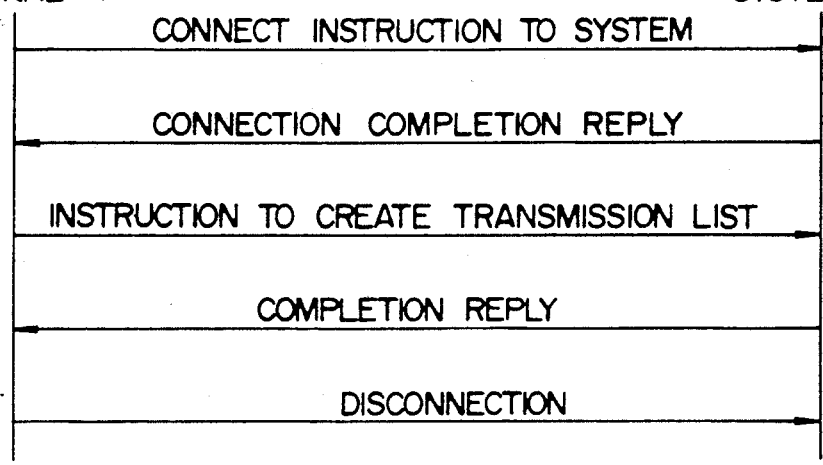
FIG. 4 is a sequence diagram showing a transmission list creation processing.

Referring next to the sequence diagram of FIG. 4, description will be given of the operation of the manager's terminal 4 to create a transmission list.

First, a connect request for a connection to the system 2 is instructed from the terminal 4 to the system 2, which then establishes a connection between the terminal 4 and the system 2 so as to notify the connection completion to the terminal 4 after the connection is completely established. In response thereto, the terminal 4 sends information to create the transmission list to the system 2, thereby controlling the system 2 to generate the transmission list and to store the obtained list in the transmitter mail box. The system 2 then issues a report notifying the completion of the transmission list create processing to the terminal 4, which in turn instructs the system 2 to disconnect the connection therebetween.

Figure 5:
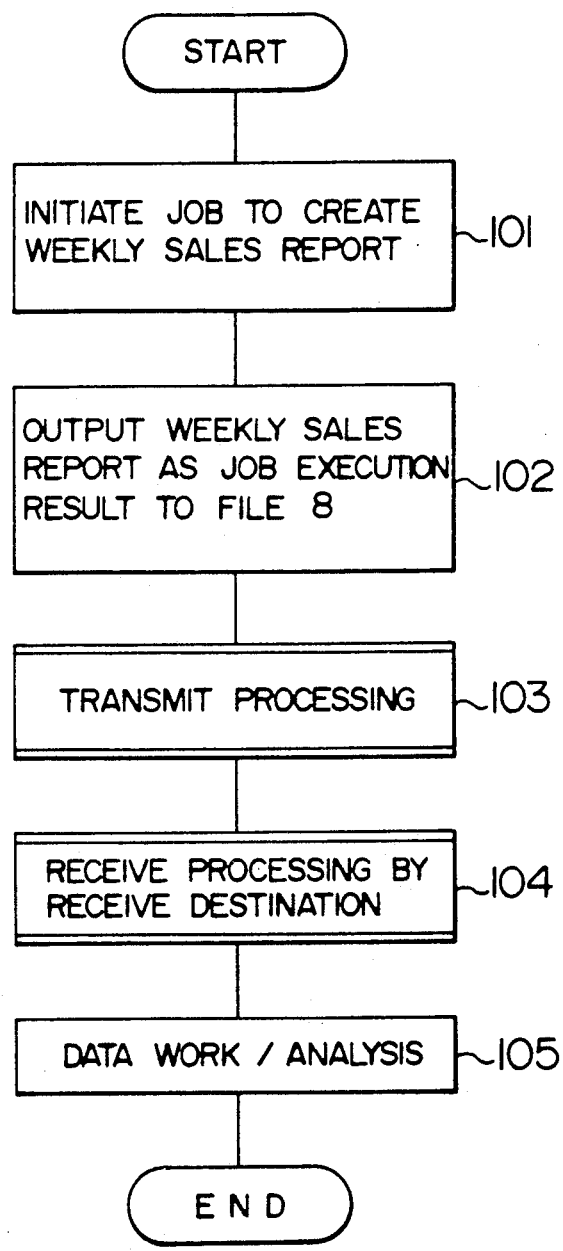
FIG. 5 is a flowchart for explaining operations of the electronic mail system of FIG. 1.

Referring now to the flowchart of FIG. 5, description will be given of the operation of the electronic mail system of FIG. 1 after the transmission list is beforehand created in this manner.

First, at an end of a week, a job is initiated to periodically create a weekly sales report in the primary business system (step 101). The initiation of the job may be accomplished by the system 2 itself or in response to an instruction from a terminal.

A weekly sales report as a result of the execution of the job thus initiated is outputted as output data so as to be stored in a file 8 as a temporary storage together with the job name (step 102).

The output data stored in the file 8 is loaded through the transmission processing in the receiver mail box 12 together with the corresponding transmission list in the transmitter mail box 10.

The weekly sales report stored in the mail box 12 is transmitted to the pertinent terminal in the reception processing effected by use of a receiver terminal (step 104).

The terminal achieved the reception processing then effects a unique work/analysis processing based on the data of the weekly sales report for the decision making (step 105). The work/analysis processing means here a processing to attain information necessary for related divisions and sections, for example, mainly to create tables and graphs associated with such information.

Referring next to the flowchart of FIG. 6, description will be given of details about the transmission processing.

The output data obtained in the processing system 2 has been sequentially stored in the file 8. In this situation, it is first checked to determine whether or not the output data having a job name specified by use of the transmission list exists in the file 8 (step 204). If this is not the case, the step 204 is repeatedly achieved until the output data is found. If the output data exists in the file 8, a judge operation is conducted in a step 205 by refering to the corresponding transmission list to determine whether or not a page range has been specified for the existing output data, for example, the weekly sales report. In a case where the page range is not specified, the default is assumed, namely, data of all pages associated with the output data is read from the file 8 (step 207). On the other hand, if the page range is specified, data of the pages specified by use of the transmission list is read therefrom (step 206). In consequence, in a case where there exists in the file 8 a weekly sales report of which the job name specified by the transmission list is the job 1, the data of pages 1 to 10 of the weekly sales report is read from the file 8.

Next, the system checks the delivery day/time specified by the transmission list corresponding to the output data read from the file 8 so as to determine whether the current day/time is past the specified day/time (step 208). If the current day/time is not past the delivery day/time, the output data is preserved until the delivery day/time arrives (step 209). In consequence, the output data is kept stored in the file 8 or the transmitter mail box 10 until arrival of the delivery day/time.

If the current day/time is past the delivery day/time, the output data is stored in the data file in the receiver mail box corresponding to the receiving terminal and information read out from the corresponding transmission list is written in the reception list, thereby creating the reception list (step 210). That is, the system writes the mail name of the corresponding transmission list as the mail name of the reception list, the transmitter name of the transmission list as the transmitter name of the reception list, the day/time when the output data and the information of the transmission list are delivered to the receiver mail box 12 as the reception day/time of the reception list, and the address of the data file at which the output data is stored therein as the data address of the reception list, thereby creating the reception list.

In consequence, for example, in a case where a weekly sales report associated with the output data corresponding to the transmission list 11a is stored in the data file 14a in the mail box 12 corresponding to the receiver terminal Tel, there is created the reception list 13a of FIG. 3.

Through the operations above, the transmission processing has been completely accomplished.

Details about the reception processing will now be described by referring to the sequence diagram of FIG. 7.

First, a receiver terminal issues to the system 2 a connection request to establish a connection between the system 2 and the terminal, which in turn establishes a connection therebetween and notifies the completion of the connection after the connection is completely established. The terminal then instructs the system 2 to display on the terminal a list of information of the reception lists destined for the terminal in the corresponding receiver mail box. In response thereto, the information of the reception lists in the corresponding receiver mail box is sent via the system 2 to the terminal so as to be displayed thereon. When the operator checks the displayed data and instructs a reception of a desired mail name based on the check result, output data (of the pertinent mail) is read from the data file specified by the data address indicated by use of the reception list corresponding to the mail name and is then sent to the terminal. When the transmission of the mail is finished in this fashion, the terminal instructs the system 2 to disconnect the connection between the system 2 and the terminal.

Through these operations, the reception processing has been completely achieved.

As described above, according to the embodiment above, since the output data like a weekly sales report to be periodically produced is automatically transmitted to the receiver mail box depending on the transmission list, the transmission processing can be achieved without necessitating an operator's intervention, which improves the efficiency of the transmission processing. In addition, by use of the receiver mail box, the receiver can freely and correctly attain the necessary output data at a high speed and at an arbitrary point of time.

In consequence, particularly in a case where the output data is to be periodically supplied, there is attained a considerable effect due to the automated operation of the transmission processing in accordance with the present invention.

In addition, according to the embodiment, without modifying programs used in the business processing system, only the necessary output data can be correctly obtained at a high speed.

In the embodiment above, although the output data is stored in the receiver mail box in the transmission processing, the output data may be directly stored in the corresponding receiver terminal.

Figure 6:
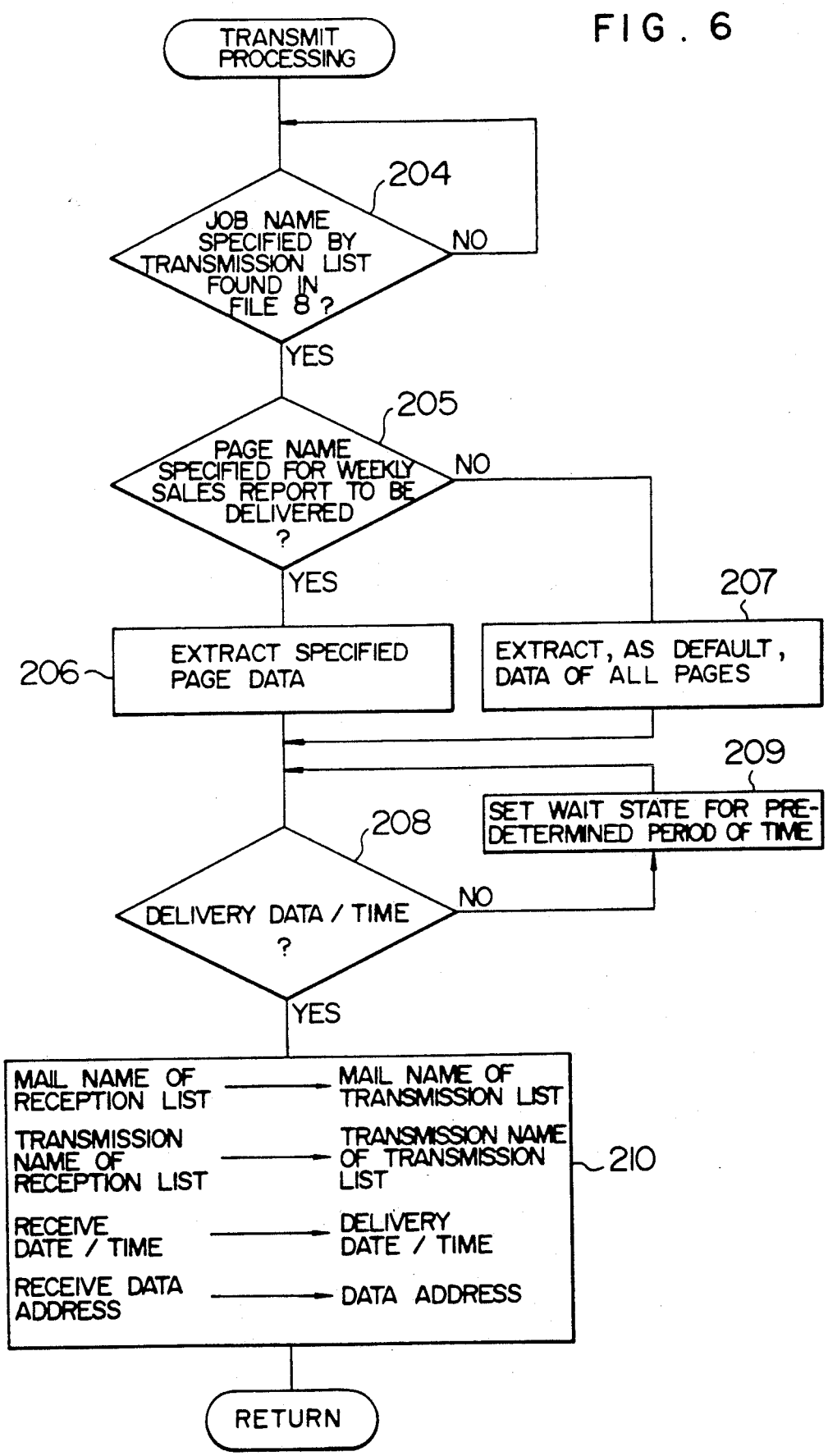
FIG. 6 is a sequence diagram showing the transmission processing in the embodiment of FIG. 1.

In this case, the receiver mail box is not disposed in the configuration of FIG. 1 such that in the step 208 of the transmission processing of FIG. 6, the output data of which the deliver day/time has already arrived is directly transmitted to the corresponding receiver terminal together with the pertinent transmission list.

Figure 7:
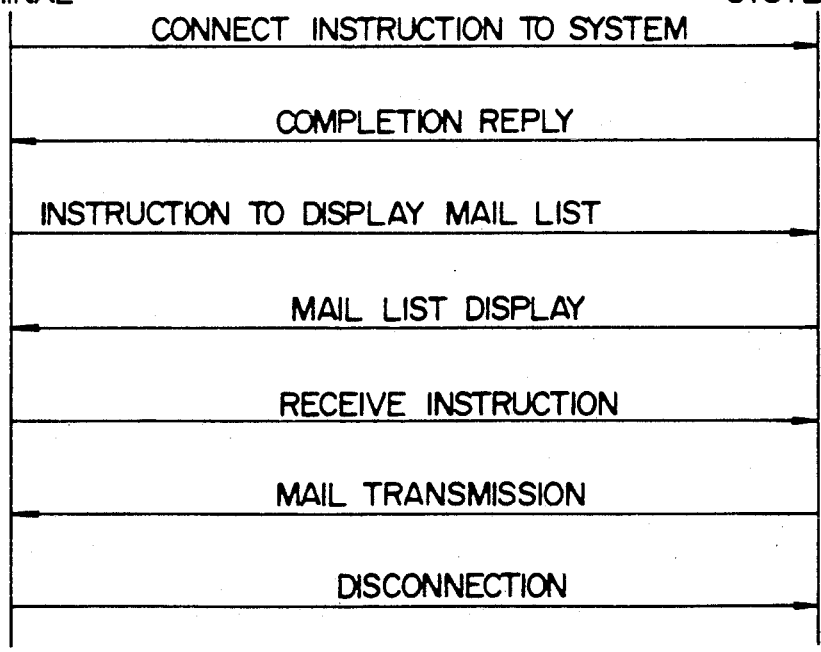
FIG. 7 is a sequence diagram showing the reception processing in the embodiment of FIG. 1.

In consequence, the step 210 of FIG. 6 is not achieved; moreover, the reception processing of FIG. 7 is not effected. That is, in the receiver terminal, necessary data obtained from the output data stored in the memory is selectively displayed or outputted as printed matter.

In this configuration, since the transfer processing of the output data to the terminals can be automatically achieved without an operator's intervention, it is possible to improve the efficiency of the transmission processing and to increase the processing capacity of the computer.

In the embodiments above, the business processing system may include a host computer, or a terminal may be provided with a function to achieve the business processing.

In addition, the output data supplied from the business processing system to the receiver mail box may be final data or intermediate data (requiring a work processing). In the latter case, the intermediate data undergoes a work in the receiver terminal so as to be converted into the final data.

In the respective embodiments above, although the transmission list is created by the manager's terminal, the transmission list may be prepared by use of the business terminal or the receiver terminal.

Furthermore, there is possibly considered a method of automating the procedure of the transmission processing. That is, the transmission list is beforehand registered to the transmitter mail box such that immediately after a job such as a job to generate a weekly report is initiated, the transmission processing is automatically executed so as to effect the registration of the list to the receiver mail box. According to this method, the human power can be further minimized and the data transmission can be more correctly effected at a higher speed.

In addition, although the description above has been given of a case related to a weekly sales report, it is to be understood that the present invention is effectively applicable to any business systems in which output data other than the weekly sales report is produced.

What is claimed is:

1. An electronic mail system comprising:
   a plurality of terminals;
   a business processing system connected to said plural terminals for effecting a business processing on the basis of data supplied from at least one of said plural terminals and for outputting a result of the processing output data in the form of print out data; and
   memory means connected to said business processing system for storing lists each containing information for each output data to specify a destination terminal to which the output data is to be transmitted, said information being supplied from at least another of said plural terminals through said business processing system;
   said business processing system including means for referring to the lists in said memory means and reading a destination terminal specified by the output data when outputting the output data, and means for outputting the output data to the read destination terminal
   said memory means includes means for beforehand loading in said lists information supplied from the at least another terminal for each output data, indicating a name of the output data and delivery day/time when the output data is to be delivered to a terminal corresponding thereto; and
   said business processing system further includes means for outputting to the corresponding terminal the output data corresponding to the output data name designated by said list at an arrival of the delivery day/time denoted by said list.

2. An electronic mail system comprising:
   a plurality of terminals;
   a business processing system connected to said plural terminals for effecting a business processing on the basis of data supplied from at least one of said plural terminals and for outputting a result of the processing as output data in the form of print out data;
   memory means connected to said business processing system for storing lists each containing information for each output data to specify a destination terminal as receiving points which receive the output data, said information being supplied from at least another of said plural terminals through said business processing system; and
   a memory unit connected to said business processing system for storing the output data for each receiving point specified by said lists, said business processing system including means for referring to the lists in said memory means and reading a destination terminal specified by the output data when outputting the output data, storing means for storing the output data and the read destination terminal specified thereby in said memory unit as a reception list, and reading means for reading the output data and the destination terminal specified by the output data from said memory unit and for outputting the output data to the read destination terminal in response to a request from the terminal as the receiving point.

3. An electronic mail system according to claim 2 wherein said business processing system includes a host computer.

4. An electronic mail system according to claim 2 wherein said business processing system includes a terminal.

5. An electronic mail system according to claim 2 wherein said memory means includes means for beforehand loading in said lists information supplied from at least another terminal, for each output data, indicating a transmitter of the output data.

6. An electronic mail system according to claim 5 wherein
   said memory means includes means for storing therein, for each said output data, information indicating a name of the output data and delivery day/time of the output data to said memory unit, and
   said business processing system includes means for storing in said memory unit output data corresponding to the data of the output data designated in the list in said memory means at a point of time when the delivery day/time designated in the list in said memory means arrives.

7. An electronic mail system according to claim 6, wherein said business processing system includes meaning for loading said memory unit, when the delivery day/time indicated in the list in said memory means arrives, with information of the list in said memory means corresponding to the output data, said information being stored as a reception list.

8. An electronic mail system according to claim 2, further comprising:
   storage means for storing the output data outputted from said business processing system;
   wherein said business processing system includes means for reading the output data from said storage means and for storing the read output data and the destination terminal specified by the output data in said memory unit as the reception list.

9. An electronic mail system according to claim 2, wherein said business processing system includes means for outputting the information of the reception list in said memory unit, in response to a request from a terminal, to the terminal.

10. An electronic mail system according to claim 2, wherein said business processing system includes means for referring, for each of said output data, to the lists in said memory means for loading a list in said memory unit with information indicating a transmitter of the output data.

11. An electronic mail system according to claim 2, wherein said business processing system includes means for referring, for each of said output data, to the lists in said memory means for loading a list in said memory unit with information indicating reception day/time of the output data.

12. An electronic mail system according to claim 2 wherein said output data is data to be periodically outputted.

13. An electronic mail system according to claim 8 wherein said information stored in said memory means is inputted from a terminal connected to said business processing system.

14. An electronic mail system according to claim 2, wherein said reading means outputs the output data to the destination terminal asynchronous with the storing of the output data and the read destination terminal in said memory unit performed by said storing means.

* * * * *